US006812929B2

(12) United States Patent
Lavelle et al.

(10) Patent No.: US 6,812,929 B2
(45) Date of Patent: Nov. 2, 2004

(54) SYSTEM AND METHOD FOR PREFETCHING DATA FROM A FRAME BUFFER

(75) Inventors: Michael G. Lavelle, Saratoga, CA (US); Ewa M. Kubalska, San Jose, CA (US); Yan Yan Tang, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 299 days.

(21) Appl. No.: 10/094,957

(22) Filed: Mar. 11, 2002

(65) Prior Publication Data

US 2003/0169263 A1 Sep. 11, 2003

(51) Int. Cl.[7] .................................................. G06F 13/18

(52) U.S. Cl. ......................... 345/535; 345/537; 345/557; 345/545; 345/540; 711/122; 711/142; 711/13

(58) Field of Search .................................. 345/503, 520, 345/531, 535, 537, 540, 545, 557; 711/122, 142, 143

(56) References Cited

U.S. PATENT DOCUMENTS

| | | | | | |
|---|---|---|---|---|---|
| 5,544,306 | A | | 8/1996 | Deering et al. | |
| 5,579,473 | A | * | 11/1996 | Schlapp et al. | 345/557 |
| 5,781,924 | A | * | 7/1998 | Zaitzeva et al. | 711/131 |
| 5,945,997 | A | | 8/1999 | Zhao et al. | |
| 6,041,393 | A | * | 3/2000 | Hsu | 711/157 |
| 6,437,789 | B1 | | 8/2002 | Tidwell et al. | |
| 6,519,682 | B2 | * | 2/2003 | Richardson et al. | 711/122 |
| 6,640,288 | B2 | * | 10/2003 | Rowlands et al. | 711/141 |
| 2002/0053004 | A1 | * | 5/2002 | Pong | 711/119 |
| 2002/0188809 | A1 | * | 12/2002 | Kershaw | 711/133 |
| 2003/0163643 | A1 | * | 8/2003 | Riedlinger et al. | 711/131 |

OTHER PUBLICATIONS

3D–RAM Spec 8 Press Release dated May 20, 1997, 2 pages.

3D–RAM Spec www.mitsubishichips.com/data/datasheets/memory/mempdf/ds/c99001.pdf, (date Aug. 1996 given in press release, see A3), 170 pages.

* cited by examiner

*Primary Examiner*—Ulka J. Chauhan
(74) *Attorney, Agent, or Firm*—Meyertons Hood Kivlin Kowert & Goetzel, P.C.; Jeffrey C. Hood

(57) ABSTRACT

A graphics system may include a frame buffer that includes several sets of one or more memory banks and a cache. The frame buffer may load data from one of the memory banks into the cache in response to receiving a cache fill request. Each set of memory banks is accessible independently of each other set of memory banks. A frame buffer interface coupled to the frame buffer includes a plurality of cache fill request queues. Each cache fill request queue is configured to store one or more cache fill requests targeting a corresponding one of the sets of memory banks. The frame buffer interface is configured to select a cache fill request from one of the cache fill request queues that stores cache fill requests targeting a set of memory banks that is not currently being accessed and to provide the selected cache fill request to the frame buffer.

17 Claims, 11 Drawing Sheets

SYSTEM AND METHOD FOR PREFETCHING DATA FROM A FRAME BUFFER

BACKGROUND OF THE INVENTION

1. Field of the Invention

This invention relates generally to the field of computer graphics and, more particularly, to prefetching image data located in a frame buffer.

2. Description of the Prior Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating “draw a box at these coordinates.” The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

A modern graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly filtered to form pixels that are provided directly to refresh the display without any intervening frame buffer storage of the pixels.

The pixels are converted into an analog video signal by digital-to-analog converters. If samples are used, the samples may be read out of sample buffer or frame buffer and filtered to generate pixels, which may be stored and later conveyed to digital to analog converters. The video signal from converters is conveyed to a display device such as a computer monitor, LCD display, or projector.

In many graphics systems, it is desirable to improve the efficiency of accesses to the frame buffer so that rendering accesses and/or display device accesses may be performed more quickly.

SUMMARY

Various embodiments of methods and systems for prefetching image data from a frame buffer are disclosed. In one embodiment, a graphics system includes a frame buffer that includes several sets of memory banks and a cache. The frame buffer is configured to load data from one of the memory banks into the cache in response to receiving a cache fill request. Each set of memory banks is accessible independently of each other set of memory banks. A frame buffer interface coupled to the frame buffer includes a plurality of cache fill request queues. Each cache fill request queue is configured to store one or more cache fill requests targeting a corresponding one of the sets of memory banks. The frame buffer interface is configured to select a cache fill request from one of the cache fill request queues that stores cache fill requests targeting a set of memory banks that is not currently being accessed and to provide the selected cache fill request to the frame buffer.

In another embodiment, a graphics system includes a frame buffer that includes a several independently accessible memory banks, several sense amplifiers, and a buffer. The frame buffer is configured to load data from one of the independently accessible memory banks into a corresponding one of the sense amplifiers in response to receiving a level two cache fill request. The frame buffer is configured to load data from one of the sense amplifiers into the buffer in response to receiving a level one cache fill request. A frame buffer interface coupled to the frame buffer includes a plurality of level two cache fill request queues. Each level two cache fill request queue is configured to store one or more level two cache fill requests targeting a corresponding one of the independently accessible memory banks. The frame buffer interface is configured to select a level two cache fill request from one of the level two cache fill request queues that stores level two cache fill requests targeting an independently accessible memory bank that is not currently being accessed and to provide the level two cache fill request to the frame buffer.

BRIEF DESCRIPTION OF THE DRAWINGS

A better understanding of the present invention can be obtained when the following detailed description is considered in conjunction with the following drawings, in which.

Figure 1:
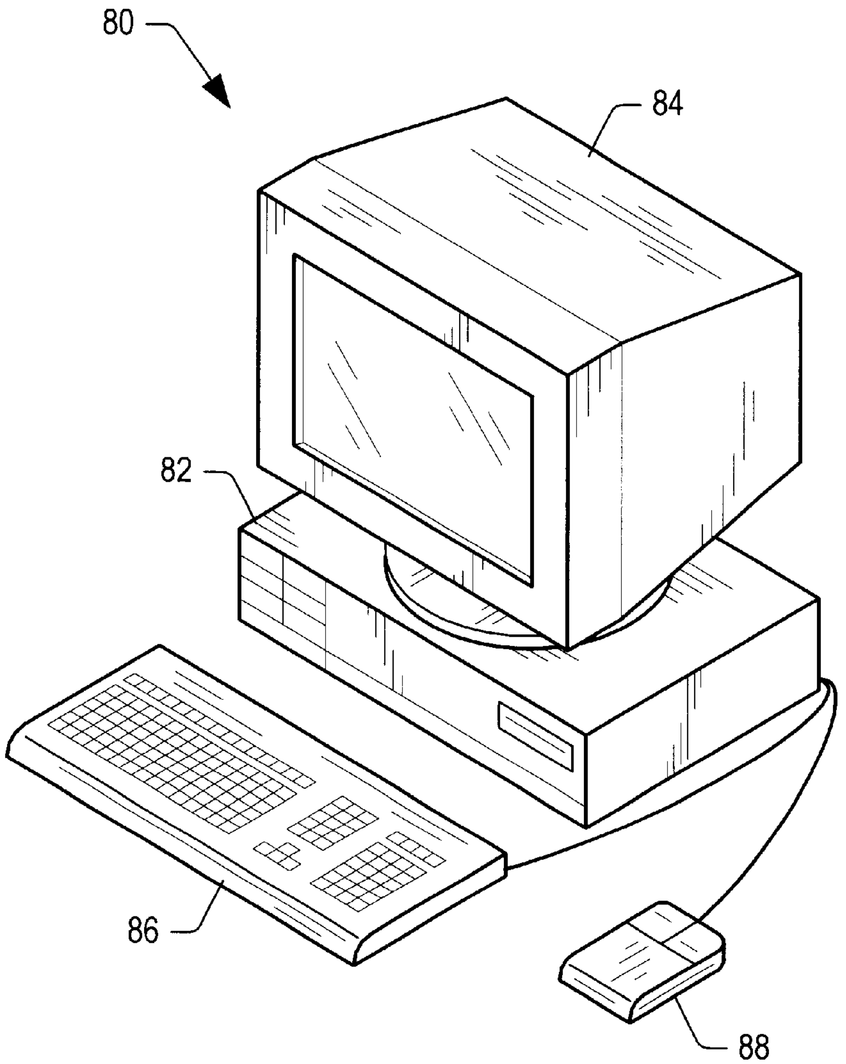
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term, "include", and derivations thereof, mean "including, but not limited to". The term "connected" means "directly or indirectly connected", and the term "coupled" means "directly or indirectly connected".

DETAILED DESCRIPTION OF EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices that display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
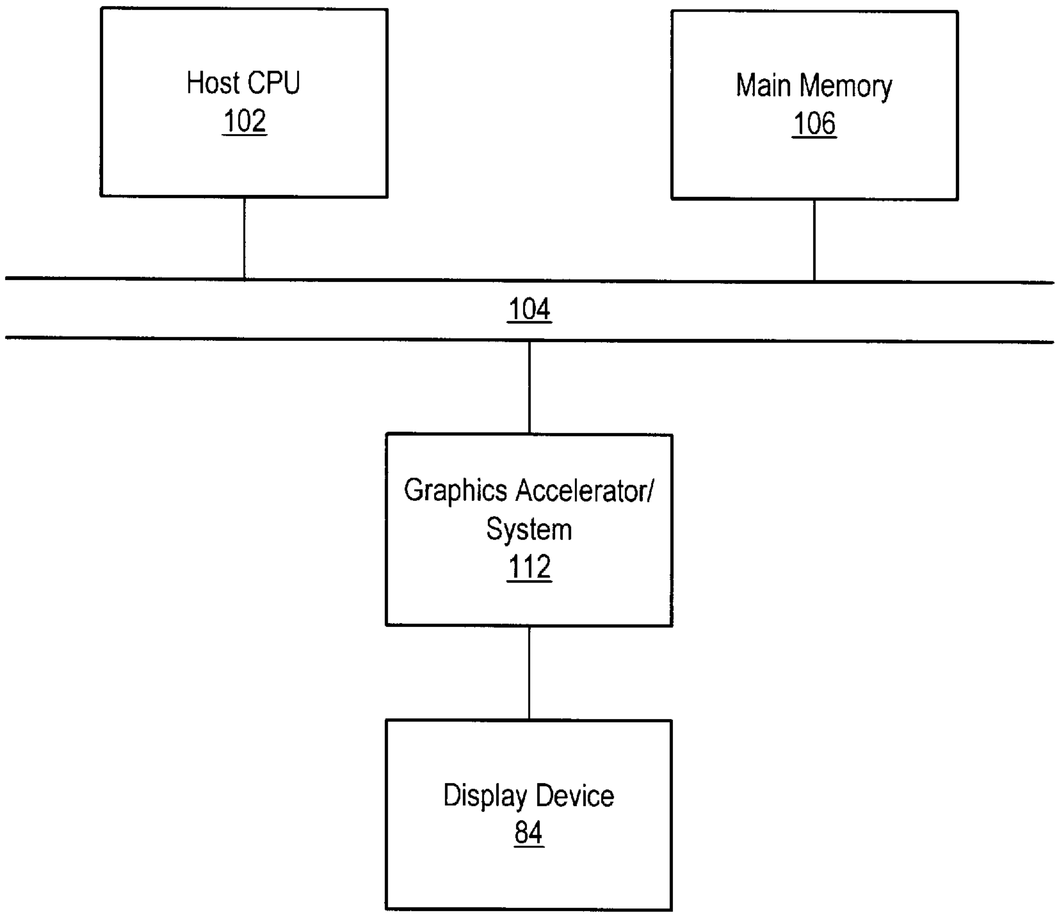
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g., the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
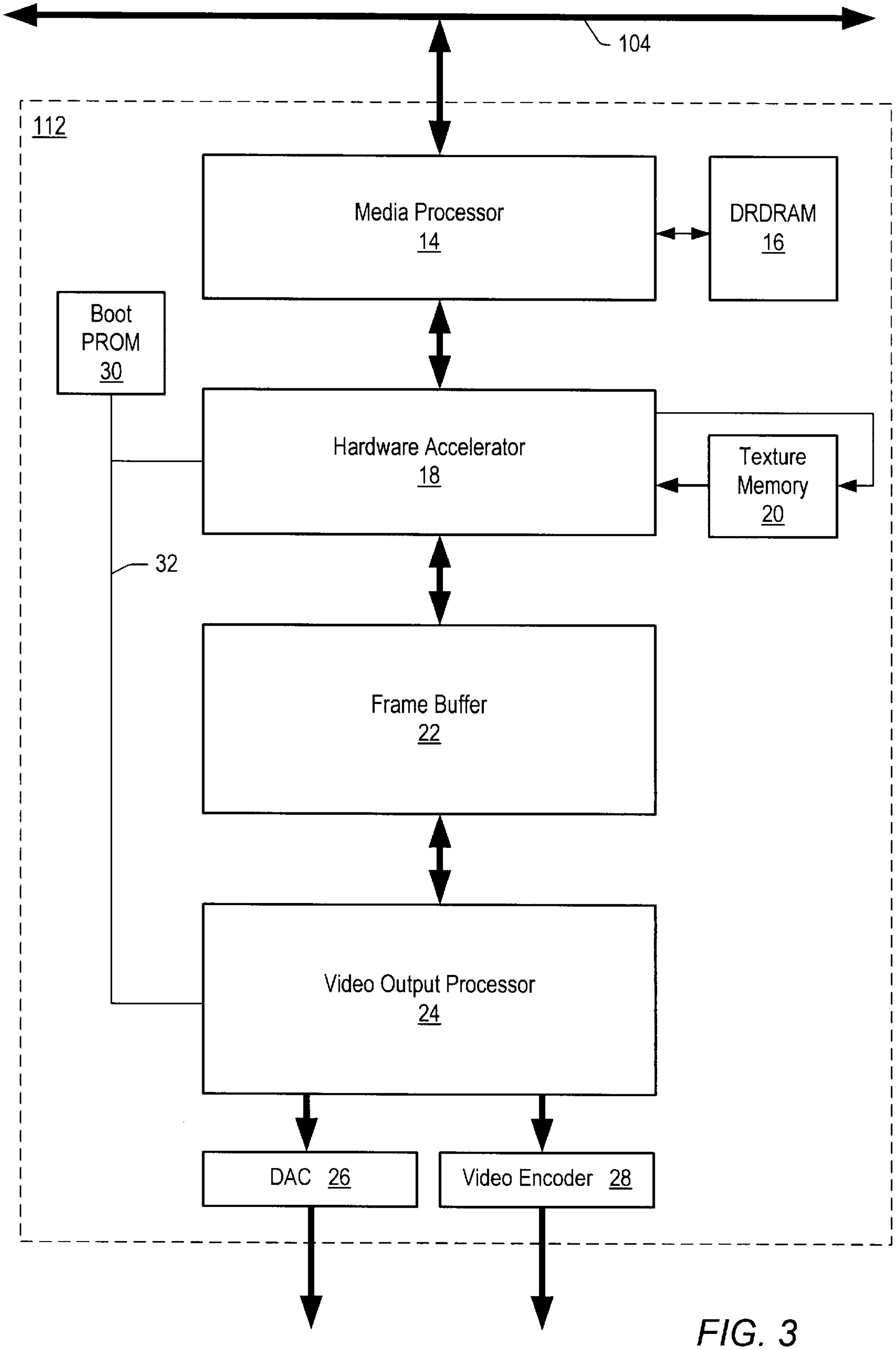
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
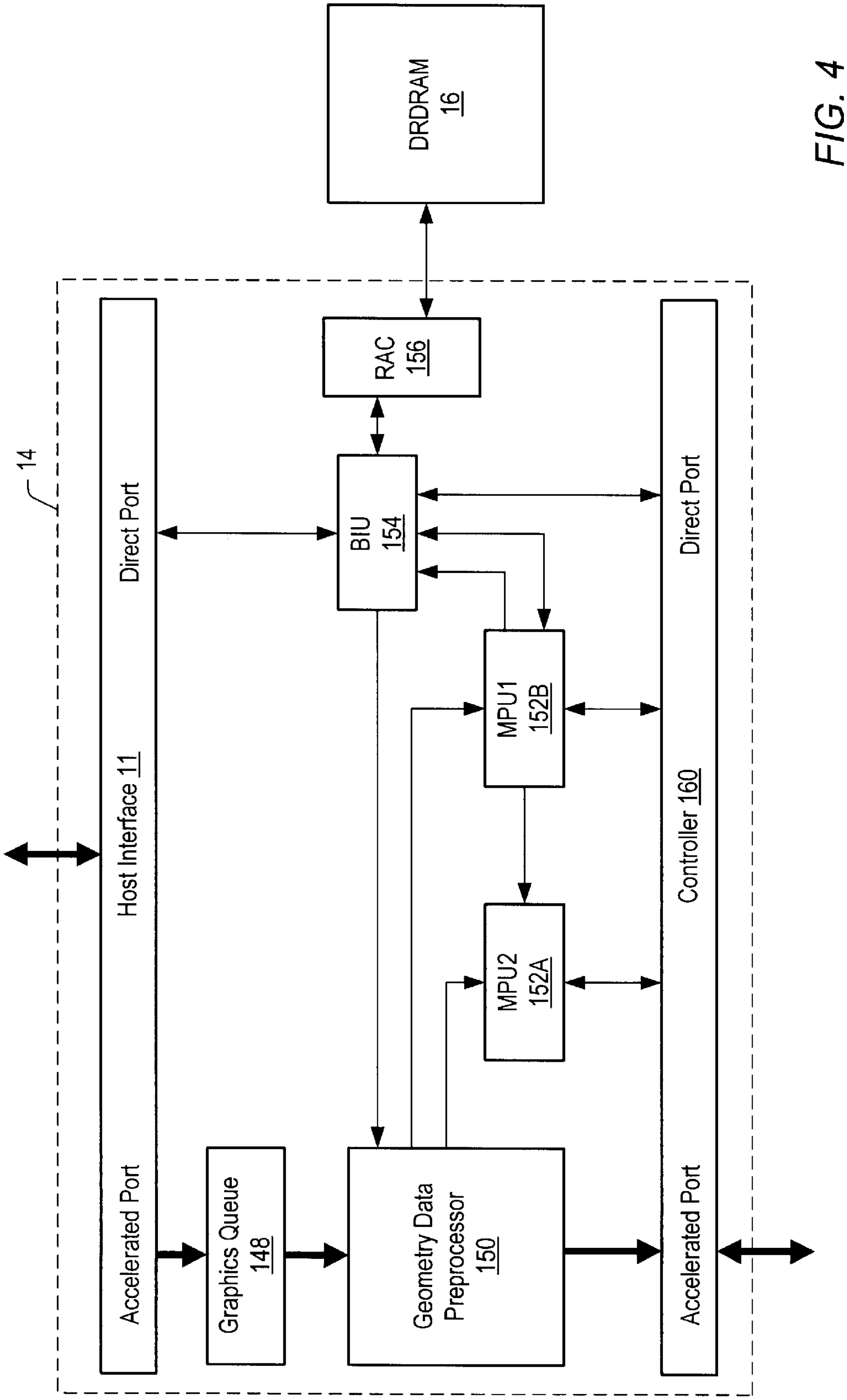
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g., stretching or shrinking), rotation, reflection, or combinations thereof. More generally, transformation may include linear mappings (e.g., matrix multiplications), nonlinear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (nonuniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e., the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
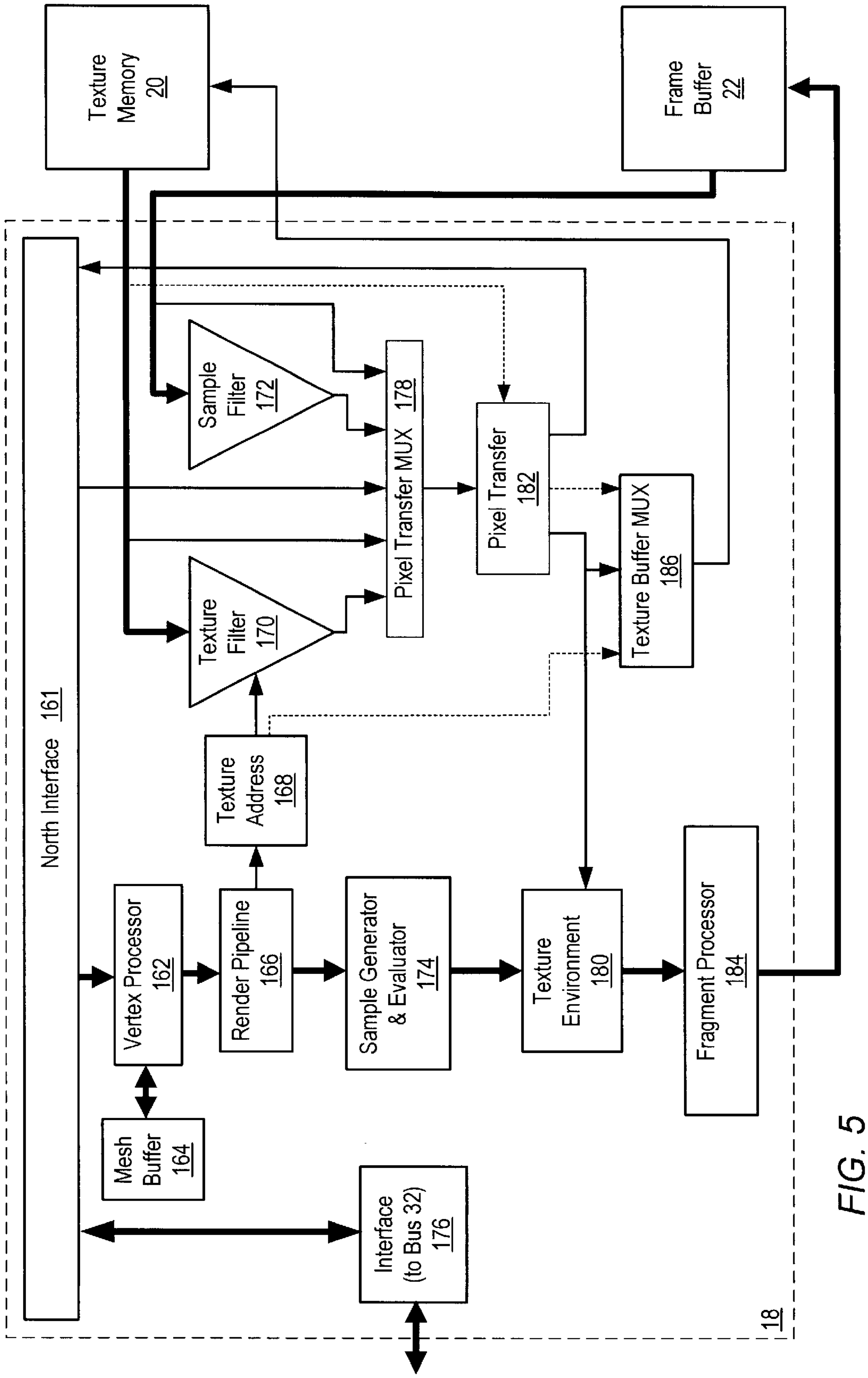
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e., transparency);

z (i.e., depth); and s, t, r, and w (i.e., texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g., addresses for a set of neighboring texels) and to determine interpolation coefficients for the texture filter 170. The texel addresses are used to access texture data (i.e., texels) from texture buffer 20. The texture buffer 20 may be interleaved to obtain as many neighboring texels as possible in each clock. The texture filter 170 may perform bilinear, trilinear or quadlinear interpolation. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may also scale and bias and/or lookup texels. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

In one embodiment, texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display data buffer, while other portions may be used as an offscreen pixel buffer and sample buffer.

Figure 6:
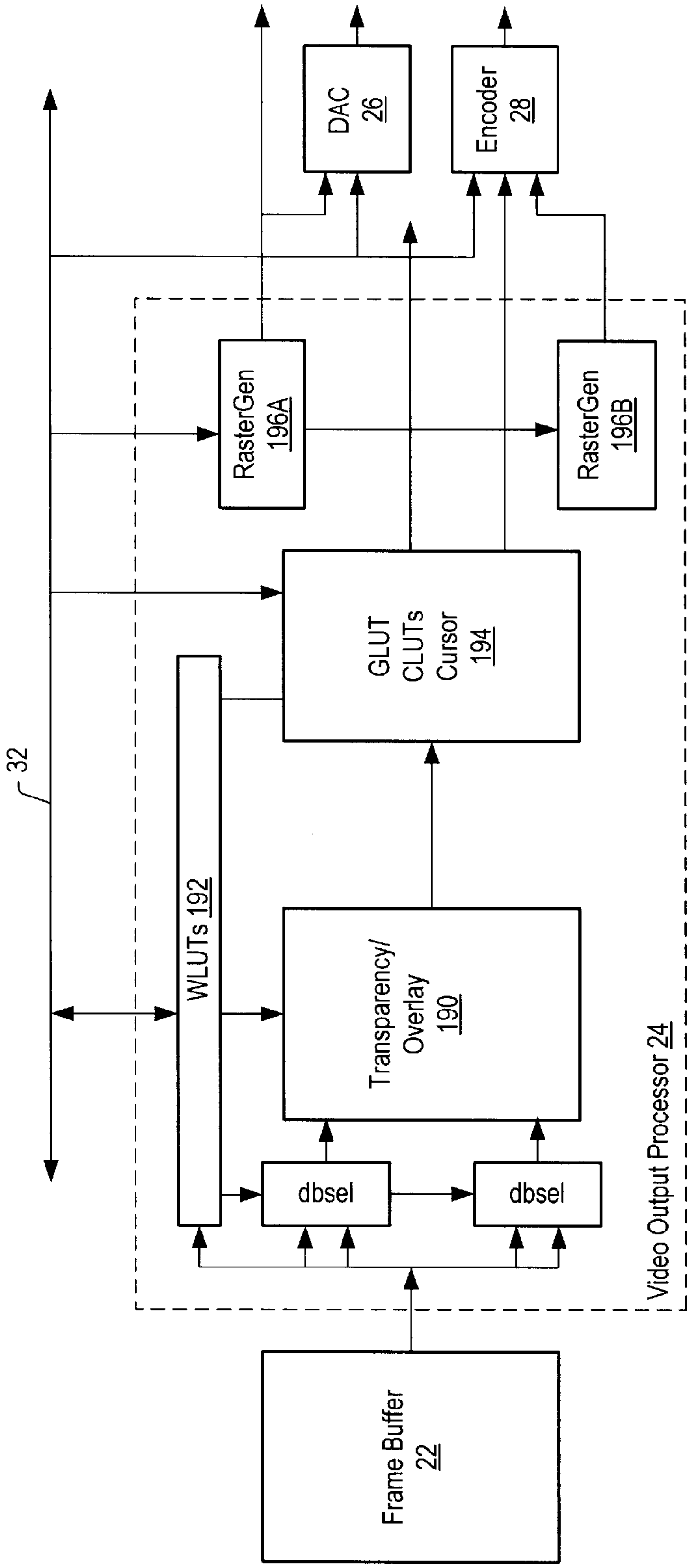
FIG. 6 is a functional block diagram of one embodiment of the video output processor of FIG. 3.

Video Output Processor—FIG. 6

A video output processor 24 may also be included within graphics system 112. Video output processor 24 may buffer and process display data (e.g., pixels and/or samples) output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3D-RAM64s 201 that include the transparency overlay 190 and all or some of the WLUTs 192. Video output processor 24 may also be configured to support multiple video output streams (e.g., video output processor may provide output streams to two displays using the two independent video raster timing generators 196). For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 may translate digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output display data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Figure 7:
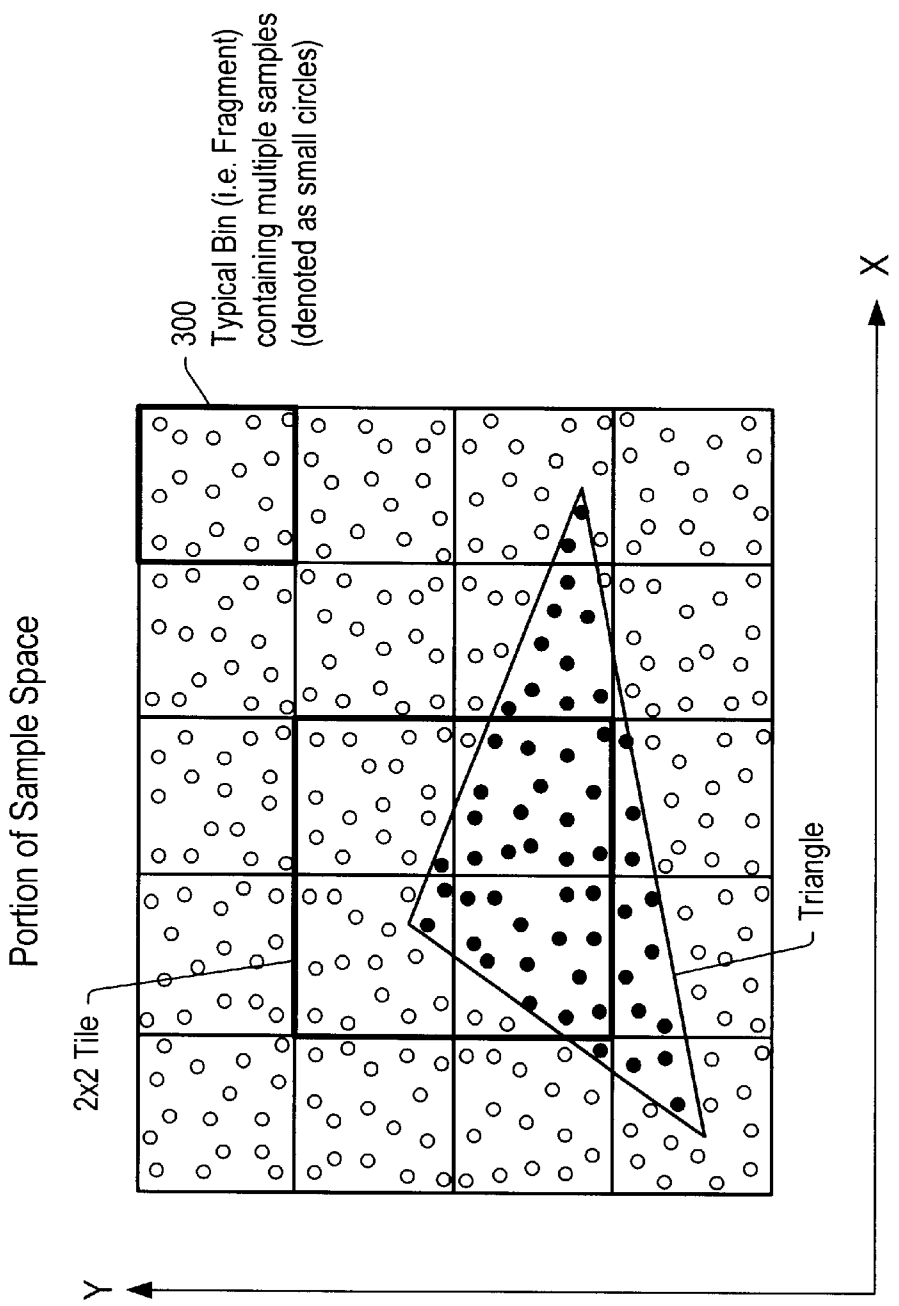
FIG. 7 shows how samples may be organized into bins in one embodiment.

Sample-to-Pixel Processing Flow—FIG. 7

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g., monitors, projectors, head-mounted displays, and so forth) through DAC 26 and/or video encoder 28.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g., bin 300) as illustrated in FIG. 7. Each bin may contain one or more samples. The number of samples per bin may be a programmable parameter.

Prefetching Frame Buffer Data

Figure 8:
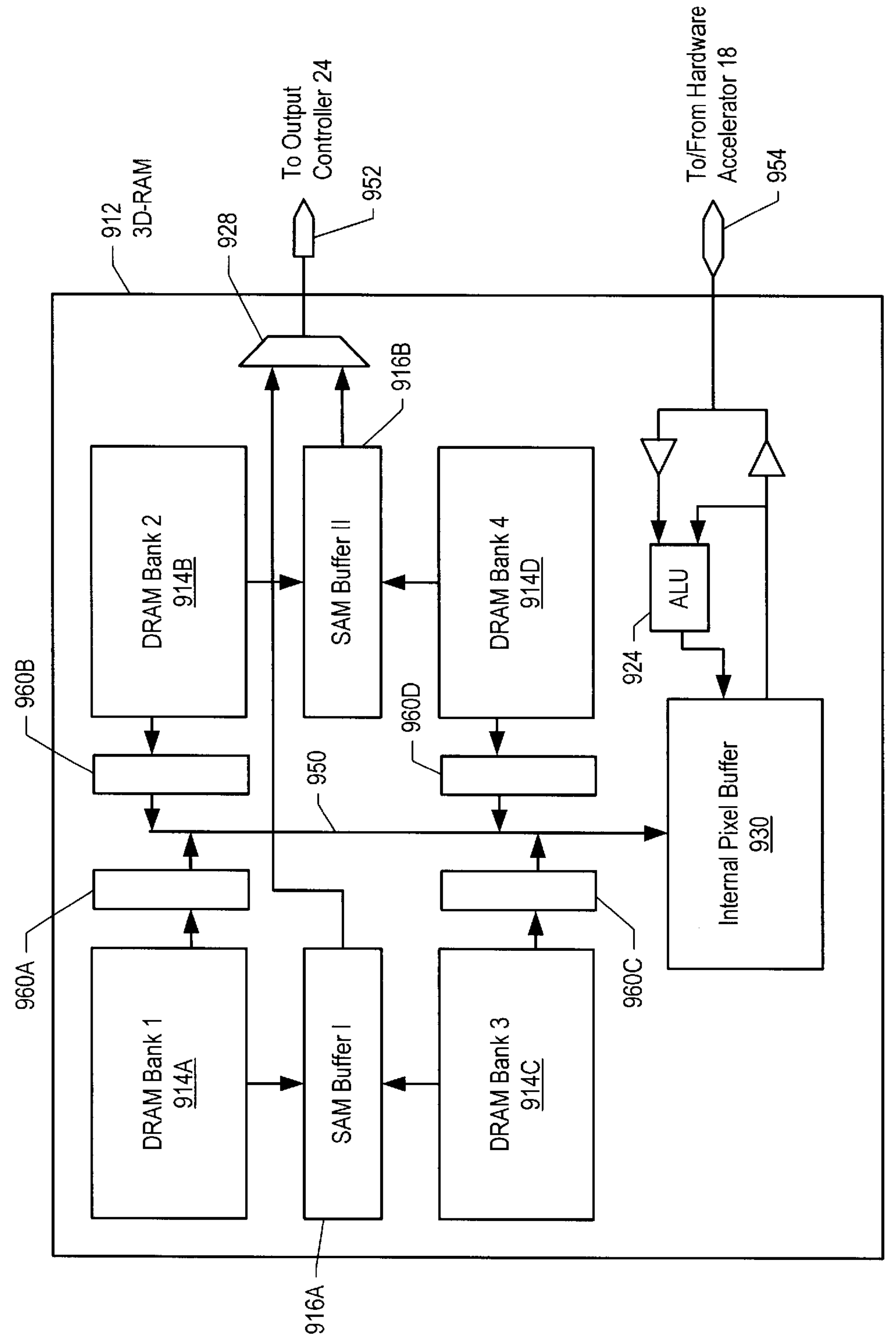
FIG. 8 shows a block diagram of a memory device that may be included in one embodiment of a frame buffer.

FIG. 8 shows an exemplary 3D-RAM device 912 that may be used in one embodiment of a frame buffer 22. 3D-RAM 912 includes four independent banks of DRAM 914A–914D (collectively referred to as DRAM 914). 3D-RAM 912 includes two access ports 952 and 954. The first port 952 is used to output display data from the two SAMs (Serial Access Memories) 916A and 916B (collectively, SAMs 916) to the output controller 24, which outputs display data to a display device. The other port 954 is accessed by the hardware accelerator 18 to read and write pixels and/or samples. Pixels and samples may be read from the DRAM banks 914 into the internal buffer 930 (e.g., an SRAM buffer) via bus 950. In order to provide data from one of the DRAM banks 914A onto bus 950, the data being accessed (e.g., a page of data) may be loaded into a sense amplifier 960A (sense amplifiers 960A, 960B, 960C, or 960D are collectively sense amplifiers 960) coupled to the DRAM bank 914A. Each of the DRAM banks 914 may be configured so that they are independently accessible. Each sense amplifier 960 may be loaded independently of each other sense amplifier.

The internal ALU (arithmetic logic unit) 924 may modify data stored in the buffer 930. While data is being modified, additional data may be written to the buffer 930. Since the 3D-RAM allows data to be modified as it is being read from the buffer (i.e., without having to output the data off-chip), operations such as Z-buffer and pixel blend operations may be more efficiently performed. For example, instead of such operations being performed as "read-modify-writes," these operations may be more efficiently performed as "mostly writes."

When providing bursts of display information to the output controller 24, the odd banks of DRAM output display information to a first SAM buffer 916A and the even banks output display information to a second SAM buffer 916B. Each buffer 916 may be loaded with display information in a single operation. Because of this configuration, display information may be read from the first SAM 916A while display information is being written to the second SAM 916B and vice versa. Multiplexer 928 may select the output from either SAM 916A or SAM 916B. The even (SAM II 916B) and odd (SAM I 916A) SAMs correspond to the even and odd DRAM banks 914.

In one embodiment, a frame buffer 22 may be implemented using one or more 3D-RAM devices 912. Each 3D-RAM device 912 may be managed by treating the buffer 930 and the sense amplifiers 960 as different levels of frame buffer cache. The sense amplifiers 960 may be managed as an L2 cache. For example, a data request may be defined as hitting in the L2 cache if the requested data is already available at the output of a sense amplifier 960. Similarly, the pixel buffer 930 may be managed as an L1 cache. In one embodiment, the L2 cache may store one or more pages of data (e.g., each sense amplifier 960 may amplify a page of data at a time) and the L1 cache may store one or more blocks of data (e.g., loaded into pixel buffer 930 from one or more sense amplifiers 960 via bus 950). In other embodiments, a frame buffer 22 may include other types of memory devices that are similarly managed as having multiple levels of cache.

Requests for data in the frame buffer 22 (e.g., from a hardware accelerator 18) may hit or miss in the L1 or L2 cache. If a data request misses in the L1 cache, it may be beneficial to prefetch the requested data into the L1 cache. Similarly, if an access misses in the L2 cache, the requested data may be prefetched into the L2 cache. If an L2 cache miss occurs, the requested data may be prefetched into the L2 cache (and/or subsequently prefetched into the L1 cache). Note that other embodiments may implement multiple levels of cache in a different manner.

Figure 9:
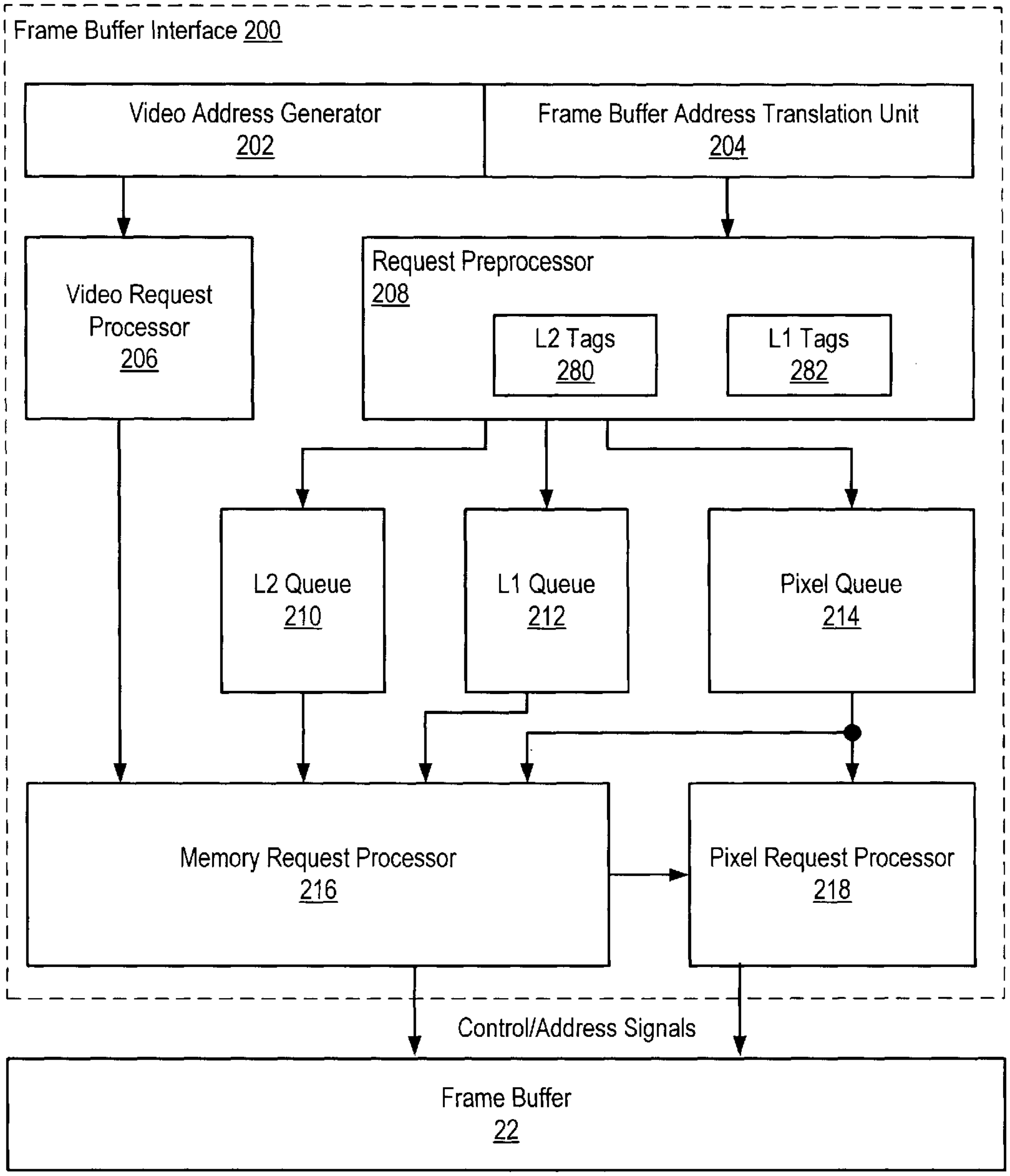
FIG. 9 shows one embodiment of a frame buffer interface that may handle requests to access data in a frame buffer.

FIG. 9 shows one embodiment of a frame buffer interface 200. In this embodiment, the frame buffer 22 is implemented with two levels of cache (e.g., an L1 cache that includes one or more blocks of SRAM and an L2 cache that includes one or more sense amplifiers). Note that in some embodiments, multiple memory chips may be included in the frame buffer. The frame buffer interface 200 receives requests for data in the frame buffer (e.g., from an output controller 24 and a hardware accelerator 18), processes the received requests, and provides the requests to the frame buffer.

The frame buffer interface 200 may include a video address generator 202 that receives requests for display data asserted by an output controller 24 and translates those requests into indications of where the requested data is located in the frame buffer 22. The video address generator 202 may provide translated requests to a video request processor 206 that may in turn provide those requests to a memory request processor 216. The video request processor 206 may determine when display requests should be processed and provide timing indications to the memory request processor 216.

The frame buffer interface 200 may also include a request preprocessor 208 that may process requests for image data asserted by the hardware accelerator 18. The hardware accelerator's requests may be received by the request preprocessor via the frame buffer address translation unit 204. For a particular pixel or block request, the request preprocessor 208 may detect whether there is a cache hit or miss according to the current status of the L1 cache and L2 cache. If there is a cache miss, the request preprocessor 208 may generate appropriate L2 and/or L1 replacement requests requesting that the data be loaded into the L2 and/or L1 cache. Note that in some embodiments, if a request hits in the L1 cache, an L2 cache fill request may not be generated even if the request misses in the L2 cache. Various replacement algorithms (e.g., LRU (Least Recently Used) replacement, FIFO (First In, First Out) replacement, and random replacement) may be used to select data for replacement within the cache. Cache hit/miss and replacement information may be stored in an L1 tags buffer 282 and an L2 tags buffer 280. Note that in some embodiments, data for display requests may also be prefetched into an L1 and/or L2 cache.

In order to begin prefetching data, the address (e.g., the page or block) of the requested data may be loaded into an L1 and/or an L2 queue of pending cache fill requests. An additional queue 214 may also store pending requests (including those that are being prefetched). Cache fill requests asserted by the request preprocessor may be sent to the L2 queue 210, the L1 queue 212, and the pixel queue 214. Note that if multiple memory chips are included in frame buffer 22, there may be an independent L1 queue 212, L2 queue 210, and pixel queue 214 for each memory chip. The request preprocessor may also update the L1 Tags buffer 282 and the L2 Tags buffer 280 in response to data being loaded into the L1 and L2 queues in some embodiments.

The L1 tag buffer 282 may store tags for data stored in the L1 cache. In one embodiment, the L1 tag buffer may store several tag entries that each correspond to a block of data in the L1 cache. Each entry may provide the request preprocessor 208 with information about a block in the L1 cache. The tags in the L1 tag buffer 282 may reflect the current state of each L1 cache block, as well as the pending L1 requests still in the L1 Queue. For example, if a pending request will change the state of the L1 cache, the tags may indicate the state after the pending request has completed. The information in an entry may include the address of the block (e.g., bank, page, column), attributes of the block (state, buffer select (if the frame buffer is double buffered), type of block (e.g., read-modify-write, read-clear-write, color block)), and/or status info (e.g., replacement information and/or a validity bit).

The L2 tag buffer 280 may store several tags that each provide the request preprocessor 208 information about the data stored in the L2 cache. In one embodiment, each tag may provide information about the data available at the output of a sense amplifier unit. The L2 tags may reflect the current state of data in the L2 cache, as well as information indicating its state after the pending L2 requests still in the L2 queue are satisfied. For example, if a pending request will bring a requested page into the L2 cache, the L2 tags may indicate that the requested page is present in the cache. Similarly, if a pending request will overwrite the requested page, which is currently in the L2 cache (e.g., because that page is the least recently used page and an LRU replacement scheme is being used), the L2 tags may indicate that the requested page misses in the L2 cache (e.g., by indicating that the requested page is invalid). The information stored in each tag may include address information (e.g., page) and/or status information (e.g., a validity indication).

The L2 queue 210 stores outstanding L2 cache fill requests. In some embodiments, the L2 queue 210 may store requests for each memory bank in a frame buffer memory chip. In one embodiment, there may be one queue entry for each frame buffer memory bank (note that other embodiments may include multiple entries for each frame buffer memory bank). The memory request processor 216 may select requests from the L2 queue 210. The L2 queue 210 may be configured to select the queue entries in any order in one embodiment, with priority given to older requests (e.g., requests that were asserted before other requests in the L2 queue 210). For example, if a first bank is busy (e.g., outputting data to a SAM 916 in response to a display request or outputting data to a sense amplifier 960 in response to another rendering access) by a display and a pending L2 request to that bank is the oldest request, the memory request processor 216 may be configured to select a request targeting another, non-busy memory bank that is accessible independently of the busy memory bank. If two requests target non-busy memory banks, the memory request processor 216 may select the oldest of the two requests. In some embodiments, by implementing the L2 queue in a way that allows non-FIFO (i.e., unordered) selection from the L2 queue 210, prefetching performance may be improved since an inability to process the oldest request at a particular time may not stall other pending L2 requests. Similar request queues may be implemented for additional levels of cache (e.g., an L3 cache) in some embodiments.

L1 queue 212 is a queue for storing pending L1 cache fill requests. In one embodiment, the L1 queue 212 may be implemented as a FIFO queue that stores one pending request for each L1 cache block. Note that other embodiments may store multiple pending requests for each L1 cache block (or for other granularities of data in the L1 cache, depending on the organization of data in the L1 cache).

In some embodiments, a frame buffer interface 200 may include a pixel queue 214 that stores pending pixel requests being provided to the frame buffer 22. In one embodiment, the pixel queue 214 may be subdivided into a pixel address queue that stores address and control information for associated pixel requests and a pixel data queue that stores data for associated pixel requests. In many embodiments, the prefetching system used to load data into the L1 and L2 queues may increase the likelihood that data requested by the requests in the pixel queue 214 has been prefetched into the L1 cache by the time each pixel request reaches the front of the queue 214.

The memory request processor 216 may issue DRAM operations to the frame buffer. The memory request processor 216 may process pending requests from the L1 queue 210, the L2 queue 212, and a video request queue (not shown) that stores requests for display data. The memory request processor may select among the various queues according to a certain priority (e.g., selecting L1 requests before L2 requests, selecting rendering requests (L1 and L2 requests) before video requests unless doing so would starve the display device, etc.). The memory request processor 216 may also handle block cleanser requests and memory refresh requests. It uses information from the Bottom L1 Tags and Bottom L2 Tags.

In some embodiments where the frame buffer 22 is implemented with an internal ALU 924, a frame buffer interface 200 may include a pixel request processor 218 that issues ALU operations to the frame buffer 22 (e.g., in embodiments where the frame buffer is implemented using 3D-RAM memory devices). The pixel request processor 218 may process pending requests (e.g., in a FIFO manner) from the pixel queue 214. When a read pixel/register request is issued, the corresponding control data (e.g., opcode, interleave enable, and/or tag data) may be sent to the frame buffer 22. The pixel processor may keep track of when valid data will be returned from the frame buffer 22 and notify recipient devices (e.g., a buffer that temporarily stores returned data and/or a device that requested the returned data) accordingly.

Figure 10:
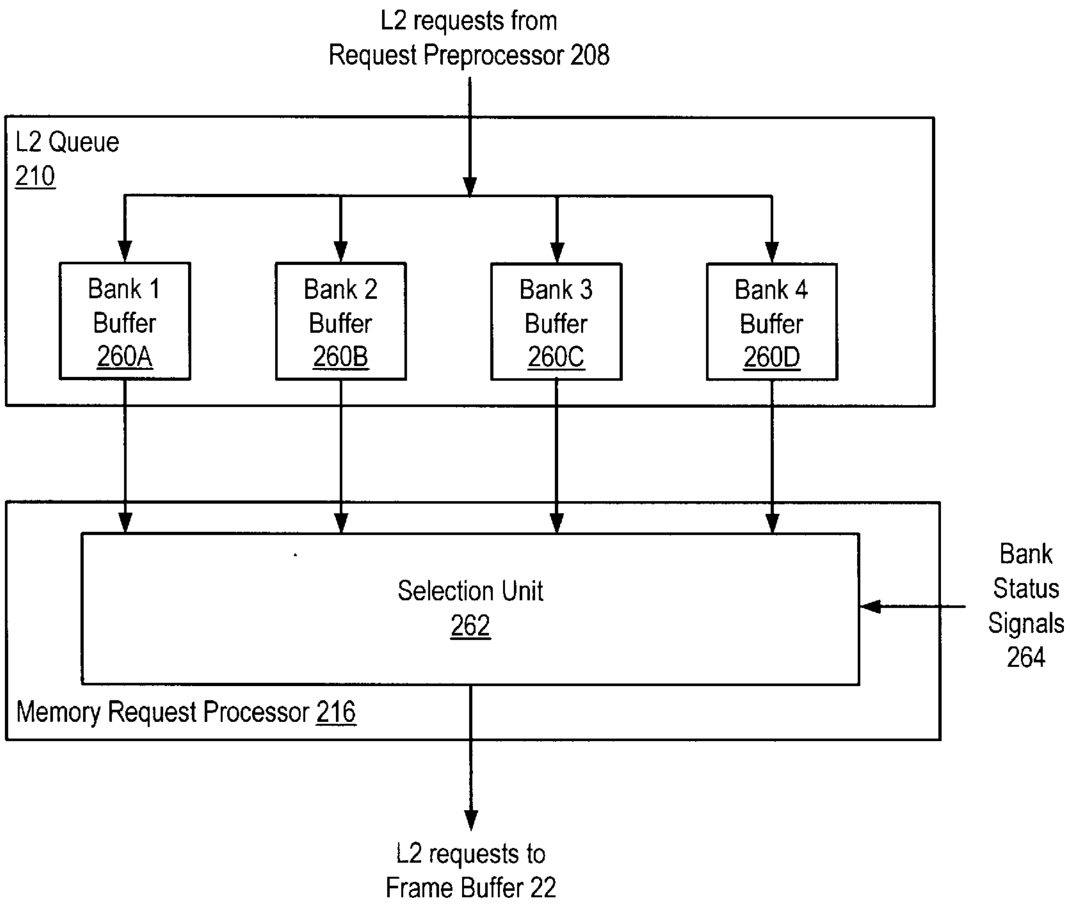
FIG. 10 is a block diagram of an L2 cache fill request queue that may be included in one embodiment of a frame buffer interface.

FIG. 10 shows one embodiment of a L2 queue 210. In this embodiment, the L2 queue 210 includes four buffers 260A, 260B, 260C, and 260D (collectively, buffers 260) that each store requests targeting a specific independently-accessible bank in a frame buffer memory device (e.g., buffer 260A stores requests targeting bank 1, buffer 260B stores requests targeting bank 2, and so on). Note that other embodiments may have different numbers of buffers. In alternative embodiments, each buffer 260 may correspond to a group of several memory banks, where memory banks within each group are not independently accessible but memory banks in different groups are independently accessible. In some embodiments, each buffer 260 may be implemented as a FIFO queue. In one embodiment, each buffer 260 may be implemented as a single-entry buffer configured to store a single pending request.

The oldest request in each buffer 260 may be output to the memory request processor 216. The memory request processor 216 may include a selection unit 262 configured to select the oldest L2 cache fill request from one of the buffers 260. However, if the oldest L2 cache fill request targets a bank that is currently busy (e.g., because it is being accessed as part of a prior access request), as indicated by the bank status signals 264, the selection unit 262 may be configured to select the next-oldest request that targets a different bank that is currently non-busy. The selection unit 262 may select the oldest request to a non-busy bank, if any, and output that request to the frame buffer 22. When the selection unit 262 outputs a request to the frame buffer 22, the entry corresponding to that request may be deallocated from the L2 queue 210, freeing room for a new request from request preprocessor 208.

Figure 11:
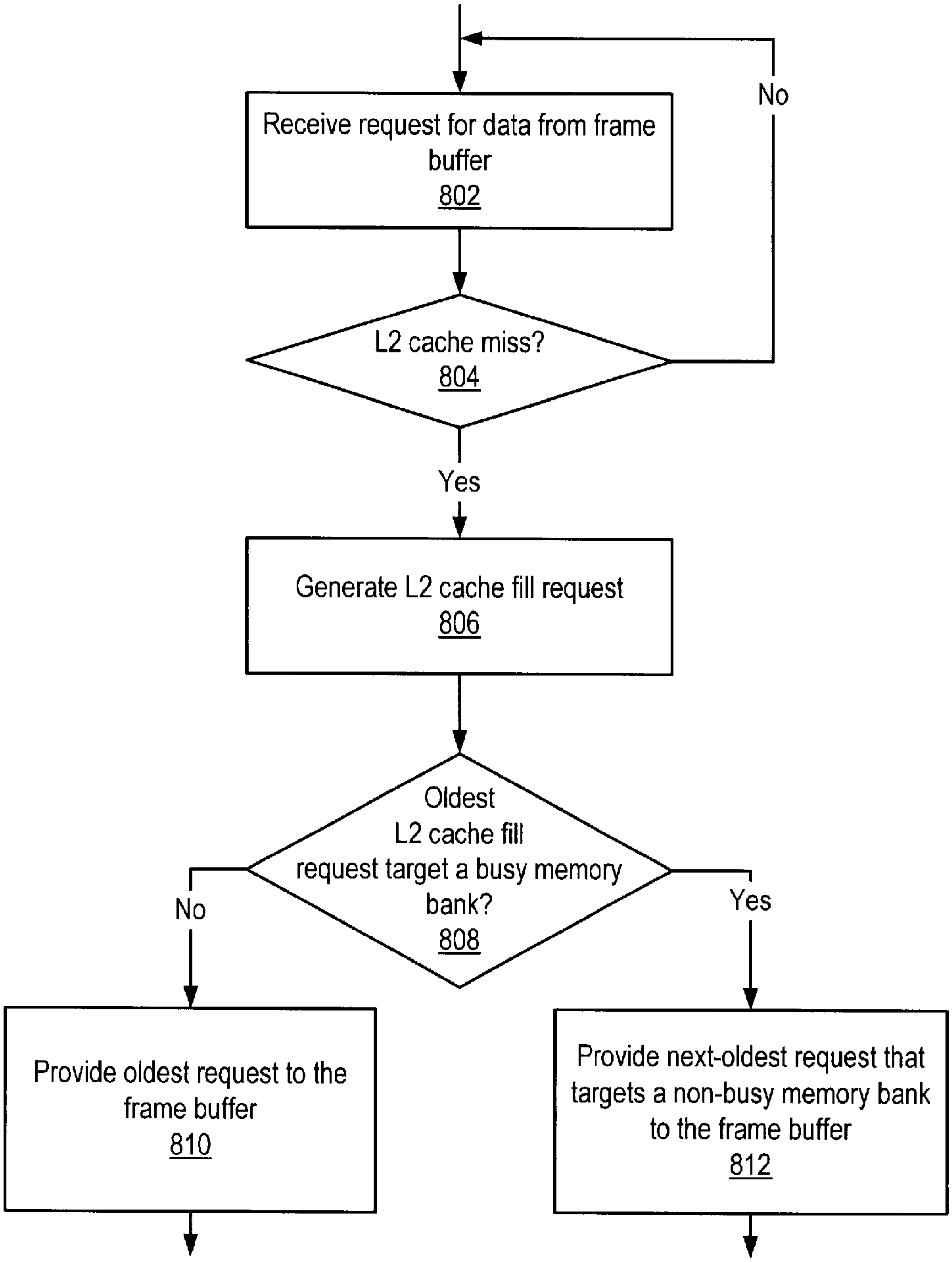
FIG. 11 is a flowchart of one embodiment of a method of handling requests to access data stored in a frame buffer.

FIG. 11 shows one embodiment of a method of handling requests to access data in a frame buffer 22 that has two levels of cache (note that other embodiments may have different levels of cache and that in those embodiments cache fill requests may correspond to a different level (e.g., L1 or L3) of cache). At 804, a request for data in the frame buffer is received (e.g., from a display device or a rendering device). If the request misses in an L2 cache (at 804), an L2 cache fill request for the requested data may be generated (e.g., by loading the request into a queue of pending L2 cache fill requests), as indicated at 806. In one embodiment, the L2 cache may be implemented using one or more sense amplifiers configured to amplify data stored in DRAM. Data may be loaded into an L2 cache in order to prefetch the data.

If the oldest L2 cache fill request targets a busy memory bank, at 808, the next oldest request that targets a non-busy memory bank (where the non-busy memory bank is accessible independently of the busy-memory bank) may be provided to the frame buffer instead of the oldest request, as indicated at 812. If the oldest request does not target a busy memory bank in the frame buffer, the oldest request may be provided to the frame buffer, as indicated at 810.

Numerous variations and modifications will become apparent to those skilled in the art once the above disclosure is fully appreciated. It is intended that the following claims be interpreted to embrace all such variations and modifications.

What is claimed is:

1. A graphics system comprising:

a frame buffer, wherein the frame buffer includes a first set of one or more memory banks, a second set of one or more memory banks, and a cache, wherein the frame buffer is configured to load data from the first set into the cache in response to receiving a cache fill request targeting the first set, wherein the first set is accessible independently of the second set; and a frame buffer interface coupled to the frame buffer, wherein the frame buffer interface comprises a first cache fill request queue configured to store one or more cache fill requests targeting the first set and a second cache fill request queue configured to store one or more cache fill requests targeting the second set;

wherein the frame buffer interface is configured to select a next cache fill request to process by:

selecting a next cache fill request from the first cache fill request queue, if the first set is not currently being accessed or selecting the next cache fill request from the second cache fill request queue, if the first set is currently being accessed and the second set is not currently being accessed.

2. The graphics system of claim 1, wherein the cache includes a plurality of sense amplifiers, wherein each sense amplifier is configured to receive data from an associated memory bank.

3. The graphics system of claim 1, wherein the cache is a level two cache and wherein the frame buffer further includes a level one cache.

4. The graphics system of claim 3, wherein the level one cache includes a SRAM (Synchronous Random Access Memory) memory device.

5. The graphics system of claim 4, wherein the frame buffer includes an arithmetic logic unit configured to process data stored in the SRAM memory device.

6. The graphics system of claim 5, wherein data requested by a processing device is output to the processing device from the level one cache.

7. The graphics system of claim 6, wherein the frame buffer interface is configured to receive a request for data from the processing device, wherein the frame buffer interface is configured to detect whether the request hits in the level one cache, wherein if the request misses in the level one cache, the frame buffer interface is configured to generate a level one cache fill request.

8. The graphics system of claim 7, wherein the frame buffer interface is configured to detect whether the request hits in the level two cache and to generate a level two cache fill request if the request misses in the level two cache, wherein the level two cache fill request is stored in a cache fill request queue corresponding to a memory bank targeted by the level two cache fill request.

9. A graphic system comprising:

a frame buffer, wherein the frame buffer includes a plurality of independently accessible memory banks, a plurality of sense amplifiers, and a buffer, wherein the frame buffer is configured to load data from one of the independently accessible memory banks into a corresponding one of the sense amplifiers in response to receiving a level two cache fill request, wherein the frame buffer is configured to load data from one of the sense amplifiers into the buffer in response to receiving a level one cache fill request; and a frame buffer interface coupled to the frame buffer, wherein the frame buffer interface comprises a plurality of level two cache fill request queues, wherein each level two cache fill request queue is configured to store one or more level two cache fill requests targeting a corresponding one of the independently accessible memory banks;

wherein the frame buffer interface is configured to select a level two cache fill request from one of the level two cache fill request queues that stores one or more level two cache fill requests targeting an independently accessible memory bank that is not currently being accessed and to provide the level two cache fill request to the frame buffer.

10. A method of operating a graphics system, the method comprising:

receiving a request for data from a frame buffer, wherein the frame buffer includes a plurality of independently accessible memory banks, wherein the plurality of independently accessible memory banks includes a first memory bank and a second memory bank;

detecting whether the request hits in a cache included in the frame buffer;

in response to the request missing in the cache, generating a first cache fill request, wherein the first cache fill request targets the first memory bank;

providing the first cache fill request to the frame buffer if the first memory bank is not currently busy and the first cache fill request is an oldest pending cache fill request; and providing a second cache fill request to the frame buffer if the first cache fill request is the oldest pending cache fill request, the first memory bank is currently busy, and the second memory bank is not currently busy, wherein the second cache fill request targets the second memory bank.

11. The method of claim 10, wherein said generating comprises storing the first cache fill request in a first cache fill request queue corresponding to the first memory bank.

12. The method of claim 11, further comprising storing the second cache fill request in a second cache fill request queue corresponding to the second memory bank.

13. The method of claim 12, wherein the cache includes a plurality of sense amplifiers, wherein the plurality of sense amplifiers includes a first sense amplifier configured to receive data from the first memory bank.

14. The method of claim 13, wherein the cache is a level two cache and wherein the frame buffer further includes a level one cache.

15. The method of claim 14, wherein the level one cache includes a SRAM (Synchronous Random Access Memory) memory device.

16. The method of claim 15, further comprising an arithmetic logic unit included in the frame buffer processing data stored in the SRAM memory device.

17. A graphics system comprising:

a frame buffer, wherein the frame buffer includes a plurality of sets of memory banks and a cache, wherein the plurality of sets of memory banks includes a first set and a second set, wherein the frame buffer is configured to load data from the first set of memory banks into the cache in response to receiving a first cache fill request targeting the first set, wherein the first set of memory banks is accessible independently of the second set of memory banks; and means for interfacing to the frame buffer, wherein the means for interfacing to the frame buffer are configured to select the first cache fill request from a plurality of pending cache fill requests and to provide the first cache fill request to the frame buffer;

wherein the means for interfacing to the frame buffer are configured to select the cache fill request if the first set of memory banks that is not currently being accessed, wherein if the first set of memory banks is currently being accessed, the means for interfacing to the frame buffer are configured to select a second cache fill request targeting the second set of memory banks and to provide the second cache fill request to the frame buffer.

* * * * *